(12) United States Patent
Watanabe et al.

(10) Patent No.: US 6,230,738 B1
(45) Date of Patent: May 15, 2001

(54) FLOW RATE CONTROL VALVE AND FLOW RATE CONTROL SYSTEM

(75) Inventors: Yasushi Watanabe; Keiichiro Senda, both of Tokyo; Hiroshi Fujita, Yokohama; Naoya Hayamizu, Yokohama; Hideaki Hirabayashi, Yokohama, all of (JP)

(73) Assignee: Tokyo Keiso Co., Ltd., Tokyo (JP)

( * ) Notice: Subject to any disclaimer, the term of this patent is extended or adjusted under 35 U.S.C. 154(b) by 0 days.

(21) Appl. No.: 09/558,785

(22) Filed: Apr. 26, 2000

(30) Foreign Application Priority Data

Apr. 30, 1999 (JP) .................................................. 11-125208
Nov. 30, 1999 (JP) .................................................. 11-340499

(51) Int. Cl.[7] .................................................. F16K 31/02
(52) U.S. Cl. ................ 137/486; 137/129.06; 137/129.11
(58) Field of Search ........................ 137/486; 251/129.11, 251/129.01, 129.06

(56) References Cited

U.S. PATENT DOCUMENTS 4,909,212 * 3/1990 Minowa et al. ............ 251/129.11 X
4,915,074 * 4/1990 Arai ............................. 251/129.11 X

* cited by examiner

Primary Examiner—Kevin Lee
(74) Attorney, Agent, or Firm—Scully, Scott, Murphy & Presser (57) ABSTRACT

A flow rate control valve comprises a driver in which a rotary shaft is rotated to adjust the opening degree of a valve body. The driver is an ultrasonic motor comprising a stator having piezoelectric elements mounted thereto and a rotor mounted to the rotary shaft and resiliently pressed against the stator.

17 Claims, 3 Drawing Sheets

FLOW RATE CONTROL VALVE AND FLOW RATE CONTROL SYSTEM

CROSS-REFERENCE TO RELATED APPLICATIONS

This application is based upon and claims the benefit of priority from the prior Japanese Patent Applications No. 11-125208, filed Apr. 30, 1999; and No. 11-340499, filed Nov. 30, 1999, the entire contents of which are incorporated herein by reference.

BACKGROUND OF THE INVENTION

The present invention relates to a flow rate control valve and a flow rate control system for precisely controlling the flow rate of a target fluid to be measured.

A stepping motor or a differential transformer is used in a driver for actuating a valve body of a flow rate control valve. In a flow rate control valve in which a stepping motor is used in the driver, the stepping motor looses its holding torque for holding the rotating position of the rotary shaft if the power supply to the stepping motor is stopped. As a result, the valve body is moved by the pressure of the fluid to be measured. It follows that, in order to maintain constant the opening degree of the valve hole, it is necessary to continue to supply power to the stepping motor, leading to an increased power consumption. In addition, the heat generated by the power supply causes the temperature of the fluid to be measured to be elevated. Further, since the stepping motor is relatively large in size, it is difficult to miniaturize the apparatus.

What should also be noted is that, since the accuracy (resolution) of the rotating position control of the stepping motor is determined by the number of teeth of the stator, it is necessary for the stepping motor to include a costly stator having a large number of teeth or a large stator in order to improve the accuracy. It follows that the driver using a stepping motor is not adapted for controlling a low flow rate requiring control of a high precision.

In addition, since the stepping motor generates a magnetic field, the electronic devices arranged around the flow rate control valve tend to be adversely affected to cause, for example, malfunction.

The driver using a differential transformer also gives rise to problems similar to those produced by the driver using a stepping motor. In addition, the differential transformer is caused to incur malfunction in the presence of magnetism.

BRIEF SUMMARY OF THE INVENTION

An object of the present invention is to provide a flow rate control valve and a flow rate control system capable of maintaining the opening degree of the valve body at a high accuracy even if the power supply to the driver is stopped so as to perform the flow rate control at a high precision and not generating magnetism giving adverse effects such as malfunction to the electronic devices arranged around the flow rate control valve and the flow rate control system.

According to one embodiment of the present invention, there is provided a flow rate control valve for controlling the flow rate of a target fluid to be measured, comprising:

an apparatus body having a valve hole;

a valve body for opening/closing the valve hole; and a driver consisting of an ultrasonic motor having a rotary shaft for driving the valve body to adjust the opening degree of the valve hole so as to control the flow rate of the target fluid flowing through the valve hole.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A flow rate control valve according to one embodiment of the present invention will now be described in detail with reference to the accompanying drawings.

Figure 1:
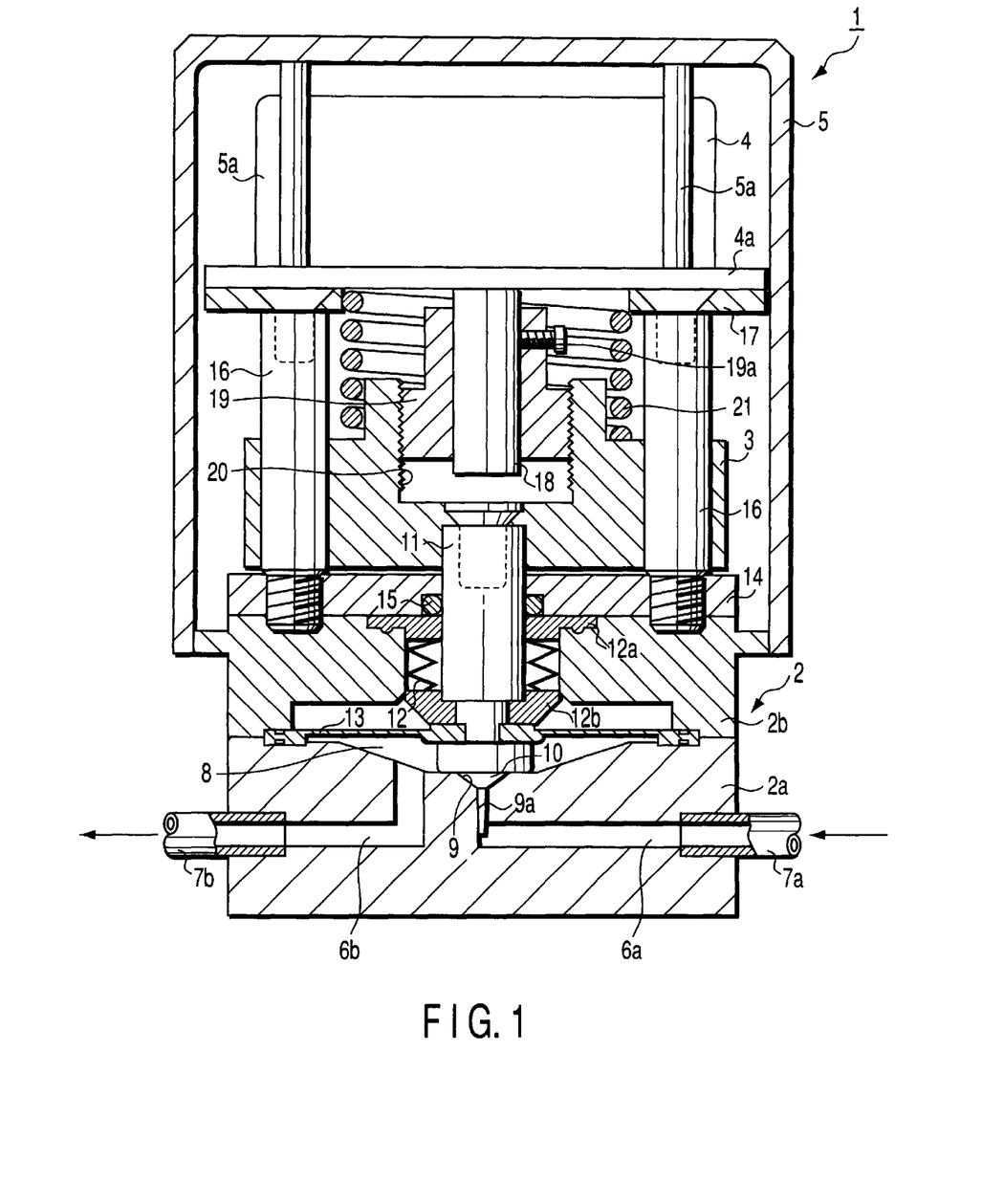
FIG. 1 is a vertical cross sectional view showing a flow rate control valve according to one embodiment of the present invention.

FIG. 1 is a vertical cross sectional view showing a flow rate control valve 1 according to one embodiment of the present invention. As shown in the drawing, the flow rate control valve 1 comprises an apparatus body 2 of the flow rate control valve, a slider 3, a driver 4 and a cover 5.

The apparatus body 2 has a lower body 2a and an upper body 2b. A target fluid inflow passageway 6a and a target fluid outflow passageway 6b are formed in the lower body 2a. A target fluid inlet pipe 7a is mounted to the outer end of the inflow passageway 6a. Likewise, a target fluid outlet pipe 7b is mounted to the outer end of the outflow passageway 6b. Further, a valve hole 9a and a valve seat 9 are mounted on the inner edge of the inflow passageway 6a, i.e., on the side of a valve chamber 8.

The valve hole 9a is opened and closed by a valve body 10, which is formed at the lower end of a valve rod 11 mounted to the slider 3. The clearance between the valve rod 11 and the upper body 2b is sealed by a bellows 12 and a diaphragm 13.

The upper portion of the bellows 12 is fixed to an upper ring 12a and the lower portion of the bellows 12 is fixed to a lower ring 12b mounted near the lower end portion of the valve rod 11. The upper ring 12a is fixed between the upper body 2b and a holding plate 14 joined to the upper surface of the upper body 2b. On the other hand, the lower ring 12b is vertically movable integrally with the valve rod 11.

The central portion of the diaphragm 13 is held between the valve body 10 and the lower ring 12b, and the outer peripheral portion of the diaphragm 13 is fixed between the lower body 2a and the upper body 2b. Further, the clearance between the holding plate 14 and the valve rod 11 is sealed by an O-ring 15.

The inner surfaces of the valve chamber 8, inflow passageway 6a and outflow passageway 6b, which are brought into contact with the target fluid, are covered with resin having a corrosion resistance relative to chemicals, e.g., covered with a fluorine-containing resin.

The diaphragm 13 is made of a fluorine-containing resin and, thus, exhibits a high corrosion resistance. Therefore, the diaphragm 13 can be used for the flow rate control of a highly corrosive fluid used in the washing, etching or chemical polishing step included in the manufacturing process of, for example, a semiconductor device.

It is possible to use a fluorine-containing resin for forming the entire lower body 2a in place of covering the surfaces of the valve chamber 8, inflow passageway 6a and outflow passageway 6b with a fluorine-containing resin. In short, it suffices for at least that surface which is brought into contact with the target fluid to be formed of a fluorine-containing resin.

It should be noted that a gas is permeable through a fluorine-containing resin. Therefore, if the diaphragm 13 is made of a fluorine-containing resin, it is possible for a corrosive gas, which is generated from the target fluid, to permeate through the diaphragm 13 so as to do damage to the equipment within the apparatus.

In the embodiment shown in the drawing, however, the sealing mechanism is of triple structure involving the bellows 12 and the O-ring 15 as well as the diaphragm 13, with the result that the gas leakage is prevented without fail by the sealing mechanism.

Guide support rods 16 are vertically mounted to the upper surface of the apparatus body 2. The slider 3 is mounted vertically slidable along these guide support rods 16. The driver 4 is mounted to mounting plates 17 arranged on the upper surfaces of the guide support rods 16 such that a rotary shaft 18 of the driver 4 extends downward. A male screw portion 19 is mounted to the rotary shaft 18. The male screw portion 19 is engaged with a female screw portion 20 formed in the center in the upper portion of the slider 3.

Reference numeral 5a shown in FIG. 1 denotes a support rod for mounting the cover 5. Reference numeral 19a denotes a pushing screw for fixing the male screw portion 19 to the rotary shaft 18. Further, reference numeral 21 denotes a compression coil spring for preventing backlash of the male screw portion 19.

Figure 2:
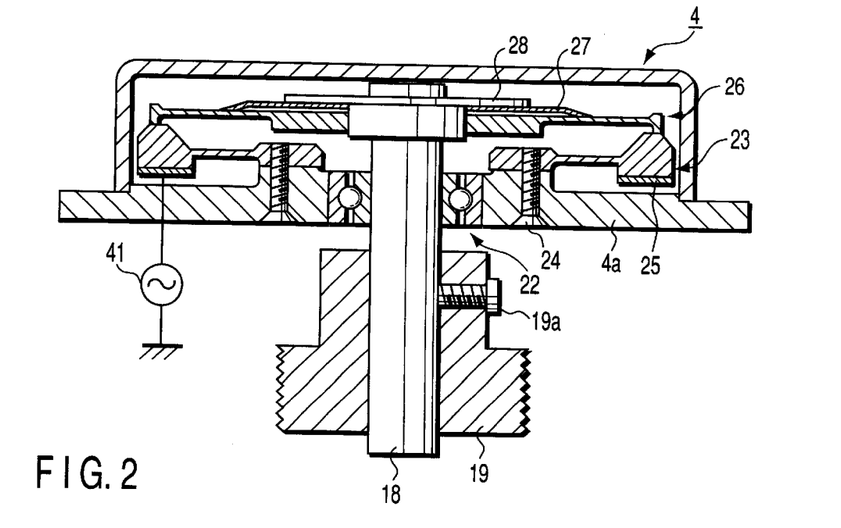
FIG. 2 is a vertical cross sectional view showing a driver included in the flow rate control valve shown in FIG. 1.

FIG. 2 shows in detail the construction of the driver 4. As shown in the drawing, a ball bearing 22 for supporting the rotary shaft 18 is arranged in a central portion of a base 4a. An annular stator 23 is fixed by a screw 24 to the upper surface of the base 4a. A large number of piezoelectric elements 25 such as piezoelectric ceramics are fixed to the lower surfaces in the peripheral portion in the radial direction of the stator 23 such that different polarities are alternately arranged in the circumferential direction of the stator 23.

Upon application of voltage, distortion (vibration) is generated by the reverse piezo effect in the piezoelectric element 25. The stator 23 supporting the piezoelectric element 25 is made of a metal such as phosphor bronze or stainless steel. The peripheral portion in the radial direction of the stator 23 is formed thicker, and a large number of recesses (not shown) extending in the radial direction are formed on the upper surface in the shape of teeth of a comb so as to amplify the distortion (vibration) generated in the piezoelectric element 25.

The lower surface in the peripheral portion of a rotor 26 having the central portion fixed to the rotary shaft 18 is pressed to the upper surface in the peripheral portion of the stator 23. A pressurizing spring 27 comprising a dish spring is mounted to the upper surface of the rotor 26. The pressurizing spring 27 is held by a holding plate 28 having a central portion fixed to the rotary shaft 18. As a result, the lower surface in the peripheral portion of the rotor 26 is allowed to resiliently abut against the upper surface in the peripheral portion of the stator 23 with a predetermined pressure, e.g., pressure of about 1.0 to 2.5 kgf/cm$^2$.

A high frequency voltage having a frequency of scores of kHz is supplied from a high frequency power source 41 to the piezoelectric element 25 of the stator 23. As a result, vibration in an ultrasonic region is generated on the upper surface of the stator 23 so as to rotate the rotor 26. In short, the driver 4 is an ultrasonic motor.

Figure 3:
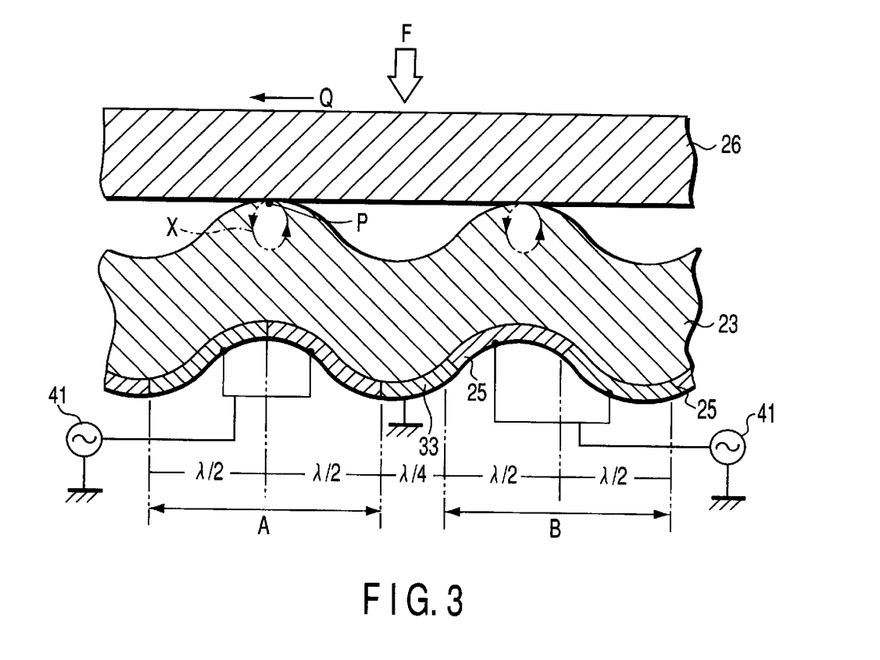
FIG. 3 shows the operating principle of the driver.

The operating principle of the driver 4 will now be described in detail with reference to FIG. 3. Specifically, a plurality of piezoelectric elements 25 mounted to the stator 23 are classified into groups A and B depending on the polarity. The adjacent piezoelectric elements of groups A and B are mounted apart from each other by a distance $\lambda/4$, $\lambda$ denoting the wavelength of a high frequency voltage.

The piezoelectric elements 25, which should be classified into at least two groups, may be grouped into three or more groups.

The piezoelectric element 25 has a width $\lambda/2$ in the circumferential direction, and high frequency voltages of different phases are supplied from the high frequency power source 41 to the piezoelectric elements of groups A and B so as to generate vibration. For example, vibration of $C \cdot \sin \omega \cdot t$, where C denotes an amplitude, $\omega$ denotes an angular frequency, and t denotes time, is generated in the piezoelectric element of group A. Also, vibration of $C \cdot \cos \omega \cdot t$ is generated in the piezoelectric element of group B. As shown in FIG. 3, an electrode 33 having a width $\lambda/4$ in the circumferential direction of the stator 23 is arranged between adjacent piezoelectric elements of groups A and B. The electrode 33 is connected to the ground.

The vibration generated by the piezoelectric elements 25 of groups A and B has a frequency of scores of kHz, which is in an ultrasonic region and equal to the frequency of the high frequency voltage applied to the piezoelectric elements. By this vibration, a traveling wave traveling in the circumferential direction of the stator 23 is generated on the upper surface in the outer peripheral portion of the annular stator 23. As a result, the upper surface of the stator 23, i.e., a point P on the surface of the traveling wave, is moved on an elliptical orbit X denoted by an imaginary line in FIG. 3 so as to drive the rotor 26 pressurized to the upper surface of the stator 23 in a direction Q tangential to the elliptical orbit X. Incidentally, an arrow F in FIG. 3 denotes the pressurizing direction of the pressurizing spring 27.

The number of rotations per unit time of the driver 4 is controlled by adjusting the high frequency voltage supplied to the piezoelectric element 25 so as to change the amplitude C. Also, the rotating direction can be reversed by inverting the phases of the high frequency voltages supplied to the piezoelectric elements of groups A and B.

The amplitude of the ultrasonic vibration is about 2 to 3 $\mu$m. It is substantially impossible for the entire flow rate control valve 1 to be vibrated by the ultrasonic vibration and for noise to be generated by the ultrasonic vibration.

The function of the flow rate control valve 1 of the present invention constructed as described above will now be described.

A fluid coming from the inlet pipe 7a flows through the inflow passageway 6a and the valve hole 9a within the lower body 2a into the valve chamber 8. In this case, the flow rate of the fluid flowing into the valve chamber 8 is regulated as desired by the clearance between the valve seat 9 and the valve body 10, i.e., by the opening degree of the valve hole 9a. Then, the fluid further flows through the outflow passageway 6b into the outlet pipe 7b.

The opening degree of the valve hole 9a is controlled by rotating the rotary shaft 18 of the driver 4 in the forward or reverse direction. If the rotary shaft 18 is rotated, the slider 3 is moved upward or downward to a desired position because the male screw portion 19 on the side of the rotary shaft is engaged with the female screw portion 20 of the slider 3. By this vertical movement of the slider 3, the valve body 10 at the lower end of the valve rod 11 is moved upward or downward to a desired position. As a result, the opening degree of the valve hole 9a is controlled by the clearance between the valve body 10 and the valve seat 9.

If the opening degree of the valve hole 9a is set at a predetermined value, the rotary shaft 18 is held incapable of rotation because the rotor 26 is pressed against the stator 23 by the pushing force of the pressurizing spring 27 even if the power supply to the driver 4 is stopped. As a result, the opening degree of the valve hole 9a is maintained at the predetermined value.

The flow rate control valve 1 of the present invention produces prominent effects as pointed out below.

(1) First of all, in the driver 4 of the flow rate control valve 1, the rotary shaft 18 is actuated by the ultrasonic vibration. Since an electromagnetic force is not utilized unlike the stepping motor used as a driver in the conventional flow rate control valve, it is unnecessary to use a coil for generating an electromagnetic force, making it possible to diminish the size and to decrease the number of parts used. In addition, malfunction is not caused by the ambient magnetism, and magnetic effects are not given to the electronic equipment around the flow rate control valve 1.

(2) The angle of rotation of the driver 4 actuated by the ultrasonic vibration is controlled by the number of vibrations per unit time of the high frequency voltage supplied to the driver 4, making it possible to achieve a high resolution. In addition, the flow rate control can be achieved with a high accuracy.

(3) Since the rotor 26 of the driver 4 is pressed against the stator 23 by the pressurizing spring 27, the rotary shaft 18 is prevented from being moved by the external force such as the pressure of the fluid even if the power supply to the driver 4 is stopped. Naturally, the opening degree of the valve hole 9a is not changed and, thus, the flow rate of the fluid is not changed. In addition, it suffices to supply power to the driver 4 only when the opening degree of the valve hole 9a is adjusted, making it possible to save the power consumption. What should also be noted is that heat is not generated from the driver 4 while power is not supplied to the driver 4, making it possible to suppress the temperature elevation of the target fluid to be measured caused by the heat generation.

Figure 4:
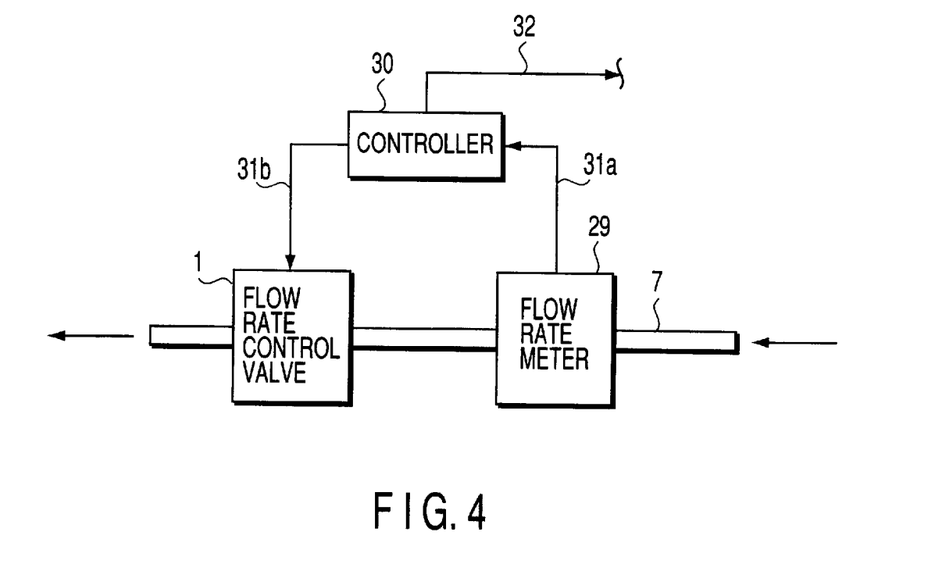
FIG. 4 is a chart showing how to use the flow rate control valve.

The flow rate control valve 1 of the construction described above is used in a flow rate control system shown in FIG. 4. As shown in the drawing, the flow rate control valve 1 is mounted to a pipe 7. A flow rate meter 29 for measuring the flow rate of the target fluid flowing through the pipe 7 is mounted to the pipe 7 upstream of the flow rate control valve 1.

The flow rate meter 29 comprises, for example, an area type flow rate meter, an ultrasonic flow rate meter, an eddy type flow rate meter, a vane type flow rate meter, a thermal flow rate meter, an electro-magnetic flow rate meter, a Coriolis-type flow rate meter, a volume type flow rate meter, differential pressure type flow rate meter, a turbine type flow rate meter or a helical flow rate meter. The measured flow rate can be output as an electric signal.

The actual flow rate value generated from the flow rate meter 29 is supplied through a signal line 31a to a controller 30. The actual flow rate value measured in the flow rate meter 29 is compared within the controller 30 with a flow rate value set in advance in the controller 30. Based on the comparison, a drive signal is supplied through a power source line 31b to the driver 4 of the flow rate control valve 1. As a result, the valve body 10 is moved upward or downward in accordance with the difference between the actually measured flow rate and the flow rate set in advance in the controller 30 so as to adjust the opening degree of the valve hole. When the difference between the actually measured flow rate detected by the flow rate meter 29 and the flow rate set in advance in the controller 30 falls within a predetermined range, the drive signal ceases to be supplied from the controller 30 to the driver 4.

Reference numeral 32 shown in FIG. 4 denotes a signal line for monitoring or remote control of the controller 30 from a central control unit such as a host computer.

Even if the opening degree of the valve hole 9a is constant, the flow rate is changed by the change in the pressure of the fluid flowing through the pipe 7 caused by, for example, operation of the valve mounted to the fluid passageway. Therefore, if the difference between the actually measured flow rate detected by the flow rate meter 29 and the flow rate set in advance in the controller 30 exceeds the predetermined range, a driving power is supplied from the controller 30 to the driver 4 of the flow rate control valve 1 so as to adjust the opening degree of the valve hole 9a to permit the actually measured flow rate to be substantially equal to the flow rate set in the controller 30.

Incidentally, a signal denoting the opening degree, which is generated from an encoder, not shown, arranged within the flow rate control valve 1, is received by the controller 30 so as to confirm the opening degree of the valve hole 9a.

It has been experimentally confirmed that, in the flow rate control system of the construction described above, the actual flow rate value of the target fluid flowing through the pipe 7 can be adjusted by the flow rate control valve 1 to conform with a high accuracy with the flow rate set in advance in the controller 30.

Table 1 shows the measured values and the average value of the actual flow rate of the target fluid flowing through the pipe 7. The actual flow rate was measured 5 times. Also, the flow rate was controlled by controlling the flow rate control valve 1 based on a signal supplied from the flow rate meter 29, and the flow rate was set at 10 ml/min in the controller 30.

Similarly, Table 2 covers the case where the flow rate was set at 20 ml/min in the controller 30. Further, Tables 3 and 4 cover the cases where the flow rate was set at 30 ml/min and 40 ml/min, respectively, in the controller 30.

TABLE 1

| No. | Actual flow rate (ml/min) | Accuracy (instructed value %) |
| --- | --- | --- |
| 1 | 9.84 | −1.6 |
| 2 | 10.09 | 0.9 |
| 3 | 10.10 | 1.0 |
| 4 | 10.09 | 0.9 |

TABLE 1-continued

| No. | Actual flow rate (ml/min) | Accuracy (instructed value %) |
|---|---|---|
| 5 | 10.14 | 1.4 |
| Average | 10.05 | 0.5 |

TABLE 2

| No. | Actual flow rate (ml/min) | Accuracy (instructed value %) |
|---|---|---|
| 1 | 20.30 | 1.5 |
| 2 | 20.32 | 1.6 |
| 3 | 20.32 | 1.6 |
| 4 | 20.40 | 2.0 |
| 5 | 20.40 | 2.0 |
| Average | 20.35 | 1.7 |

TABLE 3

| No. | Actual flow rate (ml/min) | Accuracy (instructed value %) |
|---|---|---|
| 1 | 30.26 | 0.8 |
| 2 | 30.37 | 1.2 |
| 3 | 30.31 | 1.0 |
| 4 | 30.37 | 1.2 |
| 5 | 30.40 | 1.3 |
| Average | 30.34 | 1.1 |

TABLE 4

| No. | Actual flow rate (ml/min) | Accuracy (instructed value %) |
|---|---|---|
| 1 | 40.50 | 1.3 |
| 2 | 40.64 | 1.6 |
| 3 | 40.16 | 0.4 |
| 4 | 40.82 | 2.0 |
| 5 | 40.31 | 0.8 |
| Average | 40.49 | 1.2 |

As apparent from the experimental data, the actual flow rate was controlled to fall within a range of between 0.5% and 1.7% of the flow rate set in the controller 30. In other words, it has been confirmed that the actual flow rate of the fluid flowing through the pipe 7 can be controlled accurately by controlling the driver 4 of the flow control valve 1 based on the measuring signal supplied from the flow rate meter 29.

Tables 5 to 8 show the time required for the pressure of the target fluid to be brought back to the original state in the case of changing the flow rate set in the flow rate meter 29. The experiment covered the cases where the pressure of the target fluid was set at 0.5 kg/cm², 0.75 kg/cm², and 1.0 kg/cm².

Table 5 covers the case where the flow rate set in the flow rate meter 29 was changed from 7 ml/min to 13 ml/min. Table 6 covers the case where the flow rate set in the flow rate meter 29 was changed from 13 ml/min to 7 ml/min. Table 7 covers the case where the flow rate set in the flow rate meter 29 was changed from 13 ml/min to 48 ml/min. Further, Table 5 covers the case where the flow rate set in the flow rate meter 29 was changed from 48 ml/min to 13 ml/min.

TABLE 5

| | Instructed flow rate Q = 7 → 13 (ml/min) | | |
|---|---|---|---|
| No. | 0.5 Kg/cm² | 0.75 Kg/cm² | 1 Kg/cm² |
| 1 | 2 sec | 2 sec | 1 sec |
| 2 | 2 sec | 1 sec | 1 sec |
| 3 | 2 sec | 1 sec | 1 sec |
| 4 | 2 sec | 1 sec | 1 sec |
| 5 | 2 sec | 1 sec | 2 sec |
| 6 | 1 sec | 1 sec | 2 sec |
| 7 | 2 sec | 1 sec | 1 sec |
| 8 | 1 sec | 1 sec | 2 sec |
| 9 | 2 sec | 1 sec | 1 sec |
| 10 | 2 sec | 1 sec | 2 sec |
| Average | 1.8 sec | 1.1 sec | 1.4 sec |

TABLE 6

| | Instructed flow rate Q = 13 → 7 (ml/min) | | |
|---|---|---|---|
| No. | 0.5 Kg/cm² | 0.75 Kg/cm² | 1 Kg/cm² |
| 1 | 2 sec | 1 sec | 4 sec |
| 2 | 2 sec | 7 sec | 5 sec |
| 3 | 1 sec | 10 sec | 5 sec |
| 4 | 3 sec | 6 sec | 2 sec |
| 5 | 2 sec | 3 sec | 2 sec |
| 6 | 2 sec | 2 sec | 3 sec |
| 7 | 2 sec | 7 sec | 3 sec |
| 8 | 3 sec | 6 sec | 2 sec |
| 9 | 2 sec | 3 sec | 2 sec |
| 10 | 1 sec | 3 sec | 3 sec |
| Average | 1.9 sec | 4.8 sec | 3.1 sec |

TABLE 7

| | Instructed flow rate Q = 13 → 48 (ml/min) | | |
|---|---|---|---|
| No. | 0.5 Kg/cm² | 0.75 Kg/cm² | 1 Kg/cm² |
| 1 | 2 sec | 2 sec | 2 sec |
| 2 | 2 sec | 2 sec | 3 sec |
| 3 | 2 sec | 2 sec | 2 sec |
| 4 | 2 sec | 2 sec | 2 sec |
| 5 | 2 sec | 2 sec | 2 sec |
| 6 | 2 sec | 2 sec | 2 sec |
| 7 | 2 sec | 2 sec | 2 sec |
| 8 | 2 sec | 2 sec | 2 sec |
| 9 | 2 sec | 2 sec | 3 sec |
| 10 | 2 sec | 2 sec | 2 sec |
| Average | 2 sec | 2 sec | 2.2 sec |

TABLE 8

| | Instructed flow rate 0 = 48 → 13 (ml/min) | | |
|---|---|---|---|
| No. | 0.5 Kg/cm² | 0.75 Kg/cm² | 1 Kg/cm² |
| 1 | 2 sec | 2 sec | 2 sec |
| 2 | 2 sec | 2 sec | 2 sec |
| 3 | 3 sec | 2 sec | 2 sec |
| 4 | 2 sec | 2 sec | 2 sec |
| 5 | 2 sec | 2 sec | 1 sec |
| 6 | 3 sec | 2 sec | 2 sec |
| 7 | 2 sec | 2 sec | 2 sec |
| 8 | 2 sec | 2 sec | 2 sec |
| 9 | 2 sec | 2 sec | 2 sec |
| 10 | 2 sec | 2 sec | 2 sec |
| Average | 2.2 sec | 2 sec | 2.9 sec |

As apparent from the experimental data, the flow rate control system using the flow rate control valve 1 of the present invention made it possible to bring the pressure back to a predetermined pressure in a relatively short time even if the flow rate set in the flow rate meter 29 was changed except the case where the flow rate was changed from 13 ml/min to 7 ml/min.

Tables 9 to 12 show the time required for the flow rate of the target fluid to be changed to a predetermined flow rate, covering the cases where the pressure of the target fluid was changed as denoted by an inner pressure P in each of these Tables and where the flow rate of the target fluid was set at 7 ml/min, 13 ml/min and 48 ml/min. As apparent from the experimental data, the fluid pressure can be changed into a predetermined pressure in a relatively short time even if the flow rate is changed as shown in the Tables.

TABLE 9

Inner pressure P = 0.5 → 1 (Kg/cm$^2$)

| No. | 7 ml/min | 13 ml/min | 48 ml/min |
|---|---|---|---|
| 1 | 6 sec | 2 sec | 4 sec |
| 2 | 2 sec | 1 sec | 4 sec |
| 3 | 6 sec | 2 sec | 3 sec |
| 4 | 2 sec | 2 sec | 3 sec |
| 5 | 8 sec | 2 sec | 3 sec |
| 6 | 2 sec | 2 sec | 3 sec |
| 7 | 2 sec | 2 sec | 3 sec |
| 8 | 6 sec | 2 sec | 2 sec |
| 9 | 4 sec | 3 sec | 2 sec |
| 10 | 2 sec | 2 sec | 2 sec |
| Average | 4 sec | 2 sec | 2.9 sec |

TABLE 10

Inner pressure P = 1 → 0.5 (Kg/cm$^2$)

| No. | 7 ml/min | 13 ml/min | 48 ml/min |
|---|---|---|---|
| 1 | 2 sec | 1 sec | 2 sec |
| 2 | 2 sec | 1 sec | 2 sec |
| 3 | 2 sec | 1 sec | 2 sec |
| 4 | 2 sec | 1 sec | 1 sec |
| 5 | 2 sec | 2 sec | 1 sec |
| 6 | 4 sec | 2 sec | 1 sec |
| 7 | 2 sec | 2 sec | 1 sec |
| 8 | 4 sec | 2 sec | 1 sec |
| 9 | 2 sec | 2 sec | 1 sec |
| 10 | 4 sec | 2 sec | 1 sec |
| Average | 2.6 sec | 1.6 sec | 1.3 sec |

TABLE 11

Inner pressure P = 0.75 → 1 (Kg/cm$^2$)

| No. | 7 ml/min | 13 ml/min | 48 ml/min |
|---|---|---|---|
| 1 | 2 sec | 1 sec | 2 sec |
| 2 | 8 sec | 2 sec | 2 sec |
| 3 | 9 sec | 2 sec | 1 sec |
| 4 | 5 sec | 2 sec | 1 sec |
| 5 | 2 sec | 2 sec | 2 sec |
| 6 | 3 sec | 2 sec | 2 sec |
| 7 | 2 sec | 1 sec | 1 sec |
| 8 | 7 sec | 2 sec | 1 sec |
| 9 | 10 sec | 2 sec | 2 sec |
| 10 | 2 sec | 2 sec | 1 sec |
| Average | 5 sec | 1.8 sec | 1.5 sec |

TABLE 12

Inner pressure P = 1 → 0.75 (Kg/cm$^2$)

| No. | 7 ml/min | 13 ml/min | 48 ml/min |
|---|---|---|---|
| 1 | 2 sec | 1 sec | 2 sec |
| 2 | 2 sec | 2 sec | 2 sec |
| 3 | 2 sec | 2 sec | 1 sec |
| 4 | 8 sec | 1 sec | 2 sec |
| 5 | 1 sec | 2 sec | 2 sec |
| 6 | 3 sec | 1 sec | 2 sec |
| 7 | 3 sec | 2 sec | 1 sec |
| 8 | 2 sec | 2 sec | 2 sec |
| 9 | 10 sec | 2 sec | 2 sec |
| 10 | 2 sec | 2 sec | 2 sec |
| Average | 3.5 sec | 1.7 sec | 1.8 sec |

The experimental data clearly support that, even if the flow rate or the pressure of the target fluid is changed, the flow rate control system using the flow rate control valve 1 of the present invention is capable of responding rapidly and precisely to the change.

Incidentally, a diaphragm valve is used in the flow rate control valve 1 of the present invention. However, it is also possible to use a butterfly valve, a glove valve, a gate valve, or the like in place of the diaphragm valve.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A flow rate control valve for controlling the flow rate of a target fluid to be measured, comprising:

an apparatus body having a valve hole;

a valve body for opening/closing said valve hole; and a driver including an ultrasonic motor having a rotary shaft for driving said valve body to adjust the opening degree of the valve hole so as to control the flow rate of the target fluid flowing through the valve hole, said driver comprising:

a base for rotatably supporting said rotary shaft;

an annular stator mounted on one surface of said base and surrounding one end portion, projecting upward through said base, of the rotary shaft;

a plurality of piezoelectric elements arranged in the circumferential direction of said stator;

a rotor arranged to face the stator and having the central portion fixed to one end portion of the rotary shaft;

a pressurizing spring for resiliently pressing the peripheral portion of the rotor against the peripheral portion of the stator; and a high frequency power source for supplying a high frequency voltage to said piezoelectric elements for generating an ultrasonic vibration within the stator so as to rotate the rotor;

wherein said piezoelectric elements mounted to said stator are grouped into at least two groups, and high frequency powers differing from each other in phase are supplied from said high frequency power source to the piezoelectric elements of different groups.

2. The flow rate control valve according to claim 1, wherein said driver comprises:

a base for rotatably supporting said rotary shaft;

an annular stator mounted on one surface of said base and surrounding one end portion, projecting upward through said base, of the rotary shaft;

a plurality of piezoelectric elements arranged in the circumferential direction of said stator;

a rotor arranged to face the stator and having the central portion fixed to one end portion of the rotary shaft;

a pressurizing spring for resiliently pressing the peripheral portion of the rotor against the peripheral portion of the stator; and a high frequency power source for supplying a high frequency voltage to said piezoelectric element for generating an ultrasonic vibration within the stator so as to rotate the rotor.

3. The flow rate control valve according to claim 2, wherein said piezoelectric elements mounted to said stator are grouped into at least two groups, and high frequency powers differing from each other in phase are supplied from said high frequency power source to the piezoelectric elements of different groups.

4. The flow rate control valve according to claim 2, further comprising:

a guide support rod mounted to said apparatus body;

a slider having a female screw portion formed therein and slidable along said guide support rod; and a male screw portion formed in the other end portion of the rotary shaft for engagement with said female screw portion, said valve body being driven by the engagement between said male screw portion and said female screw portion when the rotary shaft is rotated by said driver.

5. The flow rate control valve according to claim 4, further comprising a spring for eliminating backlash generated between said female screw portion and said male screw portion.

6. The flow rate control valve according to claim 4, further comprising:

a valve chamber formed in said apparatus body;

a valve rod having one end joined to said slider and the other end comprised said valve body; and a sealing member for separating liquid-tight said valve rod and said valve chamber.

7. The flow rate control valve according to claim 6, wherein said sealing member includes a diaphragm, a bellows and an O-ring.

8. The flow rate control valve according to claim 1, wherein at least the surface of that portion of the valve body which is brought into contact with the target fluid is formed of a corrosion resistant resin.

9. A flow rate control system for controlling the flow rate of a target fluid, comprising:

a pipe through which said target fluid flows;

a flow rate control valve mounted to said pipe;

a flow rate meter mounted to the pipe upstream of said flow rate control valve; and a controller for controlling the opening degree of the flow rate control valve in accordance with the flow rate detected by said flow rate meter;

wherein said flow rate control valve comprises:

an apparatus body having a valve hole;

a valve body for opening/closing said valve hole; and a driver consisting of an ultrasonic motor having a rotary shaft for driving said valve body to adjust the opening degree of the valve hole so as to control the flow rate of the target fluid flowing through the valve hole.

10. The flow rate control system according to claim 9, wherein said piezoelectric elements mounted to said stator are grouped into at least two groups, and high frequency powers differing from each other in phase are supplied from said high frequency power source to the piezoelectric elements of different groups.

11. The flow rate control system according to claim 9, further comprising:

a guide support rod mounted to said apparatus body;

a slider having a female screw portion formed therein and slidable along said guide support rod; and a male screw portion formed in the other end portion of the rotary shaft for engagement with said female screw portion, said valve body being driven by the engagement between said male screw portion and said female screw portion when the rotary shaft is rotated by said driver.

12. The flow rate control system according to claim 9, further comprising a spring for eliminating backlash generated between said female screw portion and said male screw portion.

13. The flow rate control system according to claim 9, further comprising:

a valve chamber formed in said apparatus body;

a valve rod having one end joined to said slider and the other end comprised said valve body; and a sealing member for separating liquid-tight said valve rod and said valve chamber.

14. The flow rate control system according to claim 9, wherein said sealing member includes a diaphragm, a bellows and an O-ring.

15. The flow rate control system according to claim 9, wherein at least the surface of that portion of the valve body which is brought into contact with the target fluid is formed of a corrosion resistant resin.

16. A flow rate control valve for controlling the flow rate of a target fluid to be measured, comprising:

an apparatus body having a valve hole;

a valve body for opening/closing said valve hole;

a driver including an ultrasonic motor having a rotary shaft for driving said valve body to adjust the opening degree of the valve hole so as to control the flow rate of the target fluid flowing through the valve hole, said driver comprising:

a base for rotatably supporting said rotary shaft;

an annular stator mounted on one surface of said base and surrounding one end portion, projecting upward through said base, of the rotary shaft;

a plurality of piezoelectric elements arranged in the circumferential direction of said stator;

a rotor arranged to face the stator and having the central portion fixed to one end portion of the rotary shaft;

a pressurizing spring for resiliently pressing the peripheral portion of the rotor against the peripheral portion of the stator; and a high frequency power source for supplying a high frequency voltage to said piezoelectric elements for generating an ultrasonic vibration within the stator so as to rotate the rotor;

a guide support rod mounted to said apparatus body;

a slider having a female screw portion formed therein and slidable along said guide support rod; and a male screw portion formed in the other end portion of the rotary shaft for engagement with said female screw portion, said valve body being driven by the engagement between said male screw portion and said female screw portion when the rotary shaft is rotated by said driver.

17. A flow rate control valve for controlling the flow rate of a target fluid to be measured, comprising:

an apparatus body having a valve hole;

a valve body for opening/closing said valve hole; and a driver including an ultrasonic motor having a rotary shaft for driving said valve body to adjust the opening degree of the valve hole so as to control the flow rate of the target fluid flowing through the valve hole;

wherein at least the surface of that portion of the valve body which is brought into contact with the target fluid is formed of a corrosion resistant resin.

* * * * *